United States Patent
Lang et al.

(10) Patent No.: US 8,495,147 B1
(45) Date of Patent: Jul. 23, 2013

(54) THREADING OF MIXED MEDIA

(75) Inventors: Andrew W. Lang, Epping (AU); Paul Thomas McNamara, Sydney (AU); Muneyb Minhazuddin, Quakers Hill (AU); David Preshan Thambiratnam, Ashfield (AU)

(73) Assignee: Avaya Inc., Basking Ridge, NJ (US)

( * ) Notice: Subject to any disclaimer, the term of this patent is extended or adjusted under 35 U.S.C. 154(b) by 879 days.

(21) Appl. No.: 11/487,084

(22) Filed: Jul. 13, 2006

(51) Int. Cl.
*G06F 15/16* (2006.01)

(52) U.S. Cl.
USPC .......... 709/206; 709/203; 709/204; 709/205; 709/207

(58) Field of Classification Search
None
See application file for complete search history.

(56) References Cited

U.S. PATENT DOCUMENTS

| | | | | |
|---|---|---|---|---|
| 5,966,351 | A * | 10/1999 | Carleton et al. | 369/29.01 |
| 6,484,196 | B1 * | 11/2002 | Maurille | 709/206 |
| 6,640,239 | B1 * | 10/2003 | Gidwani | 709/203 |
| 6,714,965 | B2 * | 3/2004 | Kakuta et al. | 709/204 |
| 6,959,071 | B2 * | 10/2005 | Fujisawa | 379/68 |
| 7,130,390 | B2 * | 10/2006 | Abburi | 379/88.17 |
| 7,130,885 | B2 * | 10/2006 | Chandra et al. | 709/206 |
| 7,167,910 | B2 * | 1/2007 | Farnham et al. | 709/223 |
| 7,200,556 | B2 * | 4/2007 | Aktas et al. | 704/235 |
| 7,221,745 | B2 * | 5/2007 | Finnigan | 379/88.23 |
| 7,243,125 | B2 * | 7/2007 | Newman et al. | 709/206 |
| 7,283,808 | B2 * | 10/2007 | Castell et al. | 455/413 |
| 7,284,033 | B2 * | 10/2007 | Jhanji | 709/206 |
| 7,346,696 | B2 * | 3/2008 | Malik | 709/229 |
| 7,469,280 | B2 * | 12/2008 | Simpson | 709/223 |
| 7,487,214 | B2 * | 2/2009 | Qureshi et al. | 709/206 |
| 7,487,216 | B2 * | 2/2009 | Miller et al. | 709/206 |
| 7,593,904 | B1 * | 9/2009 | Kirshenbaum et al. | 706/12 |
| 7,606,865 | B2 * | 10/2009 | Kumar et al. | 709/206 |
| 7,630,979 | B2 * | 12/2009 | Igata et al. | 1/1 |
| 7,702,315 | B2 * | 4/2010 | Engstrom et al. | 455/412.1 |
| 8,126,969 | B1 * | 2/2012 | Hall et al. | 709/206 |
| 8,161,120 | B2 * | 4/2012 | Tan | 709/206 |
| 2002/0124057 | A1 * | 9/2002 | Besprosvan | 709/219 |
| 2003/0020749 | A1 * | 1/2003 | Abu-Hakima et al. | 345/752 |
| 2003/0163537 | A1 * | 8/2003 | Rohall et al. | 709/206 |
| 2004/0078446 | A1 * | 4/2004 | Daniell et al. | 709/206 |
| 2004/0078448 | A1 * | 4/2004 | Malik et al. | 709/206 |
| 2005/0097081 | A1 * | 5/2005 | Sellen et al. | 707/3 |
| 2005/0097440 | A1 * | 5/2005 | Lusk et al. | 715/500.1 |

(Continued)

FOREIGN PATENT DOCUMENTS

| WO | 2004075466 | 9/2004 |
|---|---|---|
| WO | 2006016928 | 2/2006 |
| WO | 2006031609 | 3/2006 |

OTHER PUBLICATIONS

"Compelling Email Features," 2005, available at www.web.archive.org/web/20060514054446/http://wiki.osafoundation.org/bin/view/Jungle/CompellingEmailFeatures, 4 pages.

*Primary Examiner* — Thu Nguyen
*Assistant Examiner* — Angela Widhalm
(74) *Attorney, Agent, or Firm* — Sheridan Ross P.C.

(57) ABSTRACT

The present invention provides methods and systems for automatically threading multiple media into a single document. More specifically, a single conversation may be distributed among a number of different contacts and replies to those contacts. The distributed contacts and the corresponding replies may be chronologically ordered and analyzed. Then the repetitive portions of the documents and replies are removed. After repetitive portions of the conversation have been removed, the multiple documents are threaded together as a single representation of the conversation.

19 Claims, 6 Drawing Sheets

U.S. PATENT DOCUMENTS

| | | | |
|---|---|---|---|
| 2005/0125541 A1* | 6/2005 | Frank et al. | 709/227 |
| 2005/0203757 A1* | 9/2005 | Lei et al. | 705/1 |
| 2005/0262214 A1* | 11/2005 | Bagga et al. | 709/207 |
| 2005/0283753 A1* | 12/2005 | Ho et al. | 717/102 |
| 2006/0010195 A1* | 1/2006 | Mamou et al. | 709/203 |
| 2006/0026256 A1* | 2/2006 | Diddee et al. | 709/207 |
| 2006/0031324 A1* | 2/2006 | Chen et al. | 709/206 |
| 2006/0083357 A1* | 4/2006 | Howell et al. | 379/88.04 |
| 2006/0085502 A1* | 4/2006 | Sundararajan et al. | 709/204 |
| 2006/0143274 A1* | 6/2006 | Schulz et al. | 709/206 |
| 2006/0179112 A1* | 8/2006 | Weyer et al. | 709/206 |
| 2006/0184628 A1* | 8/2006 | Coley et al. | 709/206 |
| 2006/0190830 A1* | 8/2006 | Gerstl et al. | 715/757 |
| 2007/0041522 A1* | 2/2007 | Abella et al. | 379/88.14 |
| 2007/0050488 A1* | 3/2007 | Joyner et al. | 709/223 |
| 2007/0106721 A1* | 5/2007 | Schloter | 709/200 |
| 2007/0113101 A1* | 5/2007 | LeVasseur et al. | 713/189 |
| 2007/0115833 A1* | 5/2007 | Pepper et al. | 370/241 |
| 2007/0136433 A1* | 6/2007 | Booton et al. | 709/213 |
| 2007/0150444 A1* | 6/2007 | Chesnais et al. | 707/3 |
| 2007/0198639 A1* | 8/2007 | Litwin et al. | 709/206 |
| 2007/0198725 A1* | 8/2007 | Morris | 709/227 |
| 2007/0203982 A1* | 8/2007 | Jagoe et al. | 709/204 |
| 2007/0242656 A1* | 10/2007 | Klassen et al. | 370/352 |
| 2007/0282956 A1* | 12/2007 | Staats | 709/206 |
| 2009/0043805 A1* | 2/2009 | Masonis et al. | 707/102 |
| 2010/0174784 A1* | 7/2010 | Levey et al. | 709/206 |
| 2010/0264207 A1* | 10/2010 | Baker et al. | 235/375 |

* cited by examiner

THREADING OF MIXED MEDIA

FIELD

The invention relates generally to network based communications. More particularly, the invention relates to threading media of different types into a common document.

BACKGROUND

With the advent and proliferation of the Internet, the network interaction experience has been continually enriched over the years and much development continues. Most of the network development has been due in large part to network users desiring new ways of communicating more efficiently. One of the most basic applications afforded by the Internet is email. The introduction of email has changed the way that businesses are run. Now, rather than sending out a company wide memorandum to each employee, one only needs to send an email to all employees of the company. Meetings can be scheduled and rescheduled if necessary with the simple click of a few buttons. Indeed, simple communications are now primarily achieved through email due to its convenience.

However, there are still many instances where email is not the preferred medium of communication. One downside of email is that it is not real time and not face-to-face. Real time conversations, especially voice, video, and face-to-face conversations, allow communicating participants to perceive the speaker's tone of voice and body language, which adds another dimension of communication. Because more information can be perceived from a real time communication session, many people still use older forms of communication that do not require typing or transcription.

Obviously, there are multiple reasons to employ different forms of communication. There may be certain situations that warrant the use of email to converse with other people. On the other hand, there are other situations where the use of a telephone, videophone, short message service (SMS) messages, or instant messaging (IM) service is more desirable. For these reasons it is not uncommon for people to hold a conversation using multiple media formats.

In today's business world much communication is accomplished using multiple media formats. One person may send out a mass email to a number of other people informing them of a meeting that has been planned for later in the week. This initiating email may prompt a number of responses from the recipients of the original email. Some responses may be in the form of email, while other responses may include another type of text media. Still other people may wish to reply to the initiator by picking up the phone and calling him/her. In the event that the initiator is not at his/her desk to answer the phone, the caller places a voice message with the initiator. This flurry of responses back and forth between multiple people using multiple media types may continue for an extended period of time. When a person that was not around to see the initial email returns to his/her desk, they may be inundated with the number of emails, voice mails, video mails, and text messages that have accumulated in his/her inbox. To come up to speed with the conversation that is occurring, the person has to read through each email and listen to each voice mail to ensure that no content was missed. Only after all messages have been listened to, read, and viewed can the person feel that he/she can respond to the most recent messages with some sort of understanding of the conversation.

The burden associated with reading each email and text message and listening to every voice mail is that the recipient will likely have to read a single sentence or paragraph over and over again and listen to repetitive content. Revisiting the same content just to ensure that all content has been read and heard makes the recipient become inefficient. One possible way to avoid this inefficiency is to read the last email in the string of emails or listen to the last voice mail associated with the initiated email. Regrettably, reading the final email in the thread does not ensure that the person is aware of all the branches of the thread as it progressed.

There is a need for a system that combines multiple contacts, whether voice, video, or text, into a comprehensive contact that succinctly describes an entire conversation. There is also a need for a system that can generate personalized comprehensive contacts that reflect the conversation, as a particular user would have experienced it during the conversation. Moreover, there is a need for a way of generating a single document that can be viewed and shared by all conversational participants.

SUMMARY

These and other needs are addressed by various embodiments and configurations of the present invention. The present invention is directed generally to a system and method for analyzing and generating conversational contacts. More specifically, a number of messages, which may be of different media types, can be combined into a single document that succinctly and comprehensively represents all communications associated with a single conversation.

In accordance with one embodiment of the present invention, a method is provided for generating a conversational document. The method comprises the steps of:

(a) collecting a plurality of contacts, at least two of which comprise differing media types and each of which are associated with the conversation;

(b) combining the plurality of contacts into a single contact;

(c) identifying repetitive content that exists in at least two of the plurality of contacts; and (d) removing the repetitive content from the single contact.

The plurality of contacts, in one embodiment, are collected and combined to create a document that reflects substantially all of the different contacts that were created for a particular thread. The thread generally corresponds to a conversation that took place between two or more users. The thread may have developed a number of different branches as users responded to one another. For example, a first branch of the thread may comprise all interactions between all users that originally received the initiating contact. Thereafter, another branch of the thread may have been created when one of the recipients only responds to a subset of the original group of recipients. A third branch of the thread may have been created when one of the original recipients forwarded the contact on to another user that did not originally receive the contact. The conversation continues as additional branches are generated through responses to the initial contact.

In accordance with one embodiment of the present invention, all of the branches associated with the conversation may be combined into a single document that reflects the entirety of the conversation. One unique aspect of the present invention is that the combined document can comprise multiple media types with links or other types of communication pointers to each component referenced in the document. Each component can further have a media type indicator and include other types of information such as source party, destination parties, date and/or time components, and the like. For example, the collected contacts associated with the conversation may include emails, text messages, instant messages, fax messages, voice mails, video mails, and so on. The user can readily access each communication component by invoking or otherwise accessing the pointer. The combined document comprises multiple media types so that substantially no portion of the conversation is left out of the original document.

In accordance with one embodiment of the present invention, repeated sections of a contact that occur in another contact are removed so that the selection section occurs only once in the combined document. The removal of redundant content creates a single combined document that is not only substantially comprehensive of the conversation that occurred, but concise. A person that would like to review the conversation as it occurred can reference the combined document and will not be burdened with redundant content. Thus, by referencing the combined document, a single conversation can be reviewed efficiently and effectively.

In accordance with one embodiment of the present invention, the combined document may not comprise every branch that was generated during the conversation. Rather, the contact generator and/or the original contact recipients may hold some communications privately. There may have been some communications that occurred during the conversation that one or more of the participants want to keep private and do not want added to the comprehensive document. To accomplish this, either the contact generator or one of the contact recipients can mark the contact as private. A flag or the like is then associated with the contact indicating that the contact is private and should remain private. When a contact is marked as private, the branch resulting from that contact is generally not included in the combined document that may ultimately be provided to other users. However, the users that were a part of the private branch may have a combined document provided to them that includes the contents of the private branch. Thus, the users that were included in the private branch can review the conversation as they perceived it and not as the general public perceived the conversation. Accordingly, more than one version of the combined document may be created to reflect a single conversation. A first combined document may be created reflecting the single conversation that includes public conversation contacts only. A second combined document may be created reflecting the same conversation that includes public conversation contacts and private conversation contacts.

As used herein a "conversation" is a thread of messages and/or communications relating to a subject. A conversation may be initiated by a single communication and/or message and may have been further developed in response to the initiating communication/message. The conversation can take place using multiple media types including, without limitation, voice, text, and video media. Additional conversations may stem from an original conversation and thus may be considered part of the original conversation. Alternatively, a conversation resulting from the original conversation may be considered a separate conversation from the original conversation depending on the content of the subject conversations and who is participating in the conversation.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to create a concise representation of a conversation.

Figure 1:
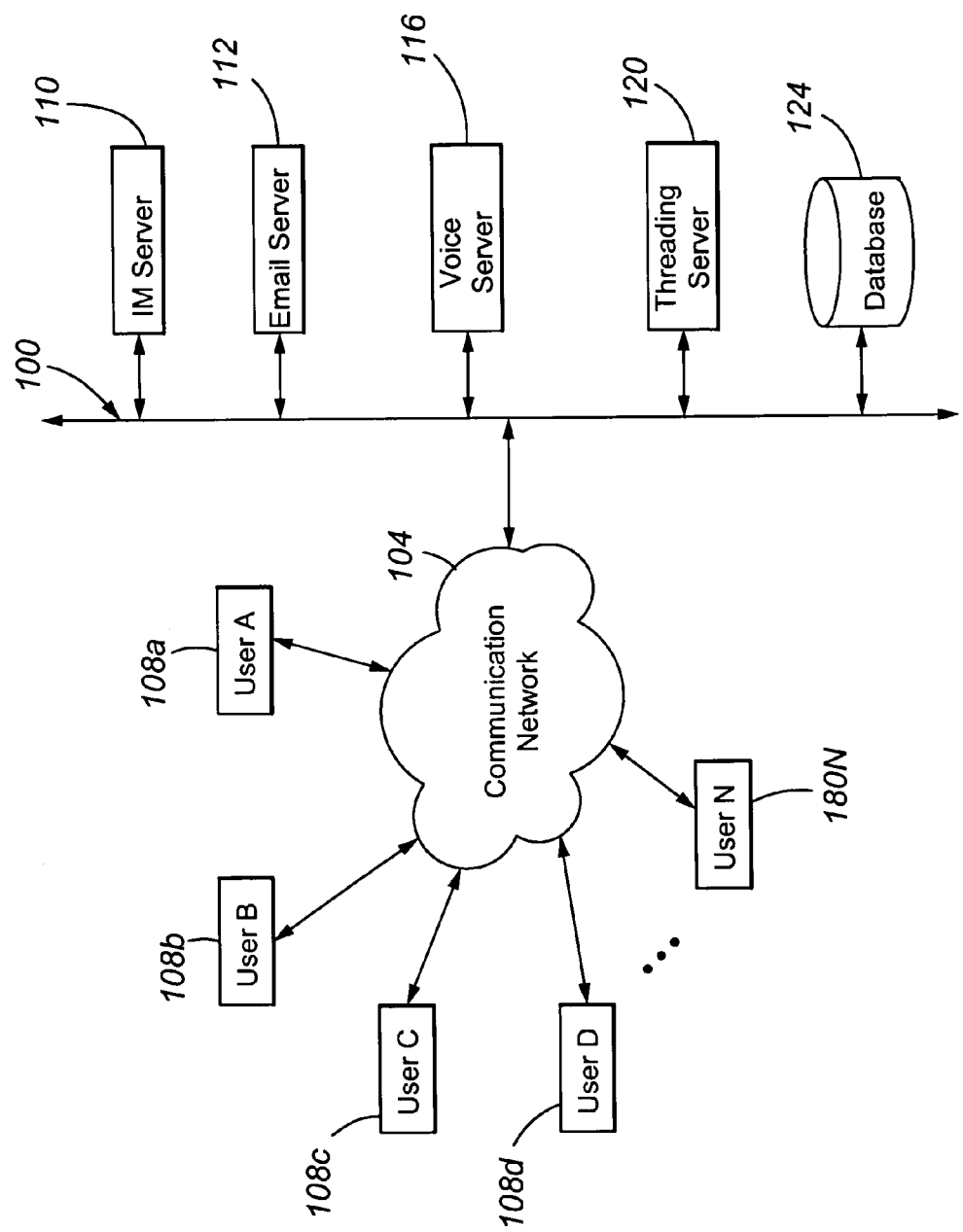
FIG. 1 is a block diagram depicting a communication system in accordance with embodiments of the present invention.

Referring initially to FIG. 1, an exemplary communication system 100 will be described in accordance with at least some embodiments of the present invention. The communication system 100 comprises a communication network 104 connecting a plurality of communication devices 108a-N, where N is typically greater than or equal to one, with an Instant Messaging (IM) server 110, an email server 112, a voice server 116, a threading server 120, and a database 124. Each communication device 108 is generally associated with at least one user. The communication device 108 is used to interact and conduct communications with other users, via their respective communication devices 108. The communication devices 108a-N can be any of a number of packet-switched or circuit-switched devices including, without limitation, analog phone, digital phone, Personal Computer (PC), laptop, Personal Digital Assistant (PDA), IP hardphone, IP softphone, wireless phone, cellular phone, fax machine, and networking equipment.

The network 104 may be any type of suitable communications network that is operable to transmit data from one communication endpoint to another endpoint using switches, proxies, and other contact routing equipment, where typical endpoints include the communication devices 108a-N. Examples of suitable types of communication networks 104 include, but are not limited to, a standard Plain Old Telephone System (POTS), an Integrated Services Digital Network (ISDN), a Public Switched Telephone Network (PSTN), a Local Area Network (LAN), a Wide Area Network (WAN) like the Internet, and any other type of packet-switched or circuit-switched network known in the art.

The IM server 110 provides for IM messaging is an asynchronous form of communication comprising routed messages. The IM server 110 represents and facilitates any of the widely available and known instant message service like AOL®, Microsoft®, ICQ® and others including those that leverage presence protocols. Two or more of the users are allowed to connect to the IM server 110 and conduct pseudo real time conversations via text messages. The string of the conversation may continue for as long as the users are connected to and interacting with the IM server 110.

The email server 112 facilitates email and other textual communications between communication devices 108a-N. In operation, a communication device 108 generates and sends an email contact via the communication network 104 to the email server 112. In the event that the receiving communication device 108 is associated with the same email server 112 (i.e., both the sending and receiving communication devices 108 are a part of the same enterprise network), the email server 112 holds the contact and notifies the receiving communication device 108 that a contact is waiting to be viewed. The receiving communication device 108 can then connect to the email server 112 to retrieve the contact. In the event that the sending and receiving communication devices 108 are not associated with the same email server 112, the email server associated with the sending communication device 108 transmits the contact to the email server associated with the receiving communication device 108 where it is held until the user of the receiving communication device wishes to view the contact.

Instead of holding the contact until the receiving communication device 108 requests to view the contact, the email server 112 may send the contact to the database 124 for storage. The email server 112 may retain the address of the contact in the database so that when the receiving communication device 108 requests to view the contact, the email server 112 can access the stored contact in the database 124 and provide the contact to the receiving communication device 108.

The database 124 may include any type of suitable storage medium capable of retaining data. Examples of suitable storage media include, but are not limited to, a disk drive such as Fibre Channel (FC) hard disk drive, a serial advanced technology attachment (SATA) disk drive, and a small computer systems interface (SCSI) disk drive. Embodiments of the present invention may also employ databases 124 utilizing data storage devices other than magnetic disks as a storage medium. For example, a database 124 may also include magnetic tape, optical storage devices, or solid-state disk devices.

The voice server 116 facilitates voice, video, and other streaming media communications between the communication devices 108a-N. During operation, a communication device 108 may attempt to contact another communication device 108 via a phone call (e.g., an analog call, a digital call, a video call, and/or a Voice over Internet Protocol (VoIP) call). In the event that the communication devices 108 are not connected, the user of the sending communication device 108 may be asked if would like to leave the intended recipient a message. If the user decides to leave a message, the sending communication device 108 is connected to the voice server 116. Once connected, the user can leave a message for the recipient. Similar to the email server 112, the voice server 116 will notify the intended recipient that a message is waiting for the user to listen to. When the intended recipient wants to listen to the message, the communication device 108 connects to the voice server 116 and the message is sent to the receiving communication device 108 for the user to hear/view.

In accordance with an alternative embodiment, a voice server 116 may not be necessary to allow the sender to leave a message for the intended recipient. Rather, the sending communication device 108 can leave a message for the receiving communication device 108 directly on the receiving communication device 108 and/or on a storage medium associated with the receiving communication device 108.

The voice server 116, in accordance with at least some embodiments of the present invention, may further be operable to record and/or transcribe a real time communication session between two communication devices 108. In the event that the sending communication device 108 is connected to the receiving communication device 108, a user of one of the communication devices 108 may request the conversation be recorded. If the voice server 116 receives the request to record the conversation between the users, then a recording mechanism is activated and the conversation can be recorded and stored in the database 124. Furthermore, a text-to-speech engine may automatically transcribe the conversation into a textual representation of the conversation.

The threading server 120, in accordance with embodiments of the present invention, is operable to parse selected data fields associated with communications and identify one or more messages/communications that are associated with a common conversation by identity of any suitable information such as message content, source party, destination parties, data and time stamp, and the like. For example, the threading server 120 can identify the times that certain contacts were created and can further analyze the contact to determine if the contact was created in response to another contact. By way of illustration, the threading server 120 can analyze a contact to determine if the string "RE:", "in response", or any other string indicative of a response appears in the contact. The threading server 120 may also analyze the header of an email contact to determine if the email was generated as a response to another previously received email. Strings in the header of the email including those discussed above and "FW:" may indicate that the email was generated in response to another email. Another indication that contacts may be associated with the same conversation is the occurrence of common key strings between contacts. For example, if a string like "meeting Friday" is found in several contacts, either in headers or in the body, then there is some likelihood that each contact is associated with the same conversation. To further determine if the contacts are associated with the same conversation, the threading server 120 may count the number of common strings and if the number of common strings between contacts is greater than a particular threshold, say five or more common strings, then the contacts may be determined to be associated with the same conversation.

The threading server 120 creates a collection of contacts that have at least a selected probability of being associated with the same conversation. The contacts may have been transmitted between only two users or the contacts may have been transmitted from many users to a number of other users. The threading server 120 takes the collection of contacts and determines if any redundant content exists within the collection of contacts. This is typically done by looking for substantially identical content in multiple communications, typically of the same modality. If the threading server 120 identifies redundant content, then the threading server 120 removes all but one instance of the redundant content. The threading server 120 then combines the collection of contacts into a single document that represents all of the content existing in the collection of contacts. For instance, an email repeats previously exchanged emails in the same thread so that the latest email in the thread includes all prior emails in the thread. Each email would occur only once. In a preferred implementation, communications of different modalities, e.g., a voice message and an email, would not be subjected to content analysis for redundancy.

In accordance with one embodiment of the present invention, the threading server 120 is also capable of removing certain contacts from the combined document. The contacts that are removed from the combined document generally include contacts that have been marked as private. The private contacts are typically not included in the content of a public combined document, although the private contacts may be included in a private version of the combined document.

The term "server" as used herein should be understood to include a PBX, an enterprise switch, an enterprise server, or other type of telecommunications system switch or server, as well as other types of processor-based communication control devices such as media servers (i.e., email servers, voice servers, web servers, and the like), computers, adjuncts, etc.

It will be appreciated by one of skill in the art after reading this disclosure that the capabilities and functions of the threading server 120 do not necessarily need to reside on a single server. Moreover, a dedicated server does not need to be used to complete the functions of the threading server 120. Rather, one or more of the communication devices 108*a*-N, email server 112, voice server 116, or any other processing unit can be used to perform functions of the threading server 120 described herein.

It should be emphasized that the configuration of the servers 110, 112, 116, and 120, user communication devices 108, and other elements as shown in FIG. 1 is for purposes of illustration only and should not be construed as limiting the invention to any particular arrangement of elements.

Figure 2:
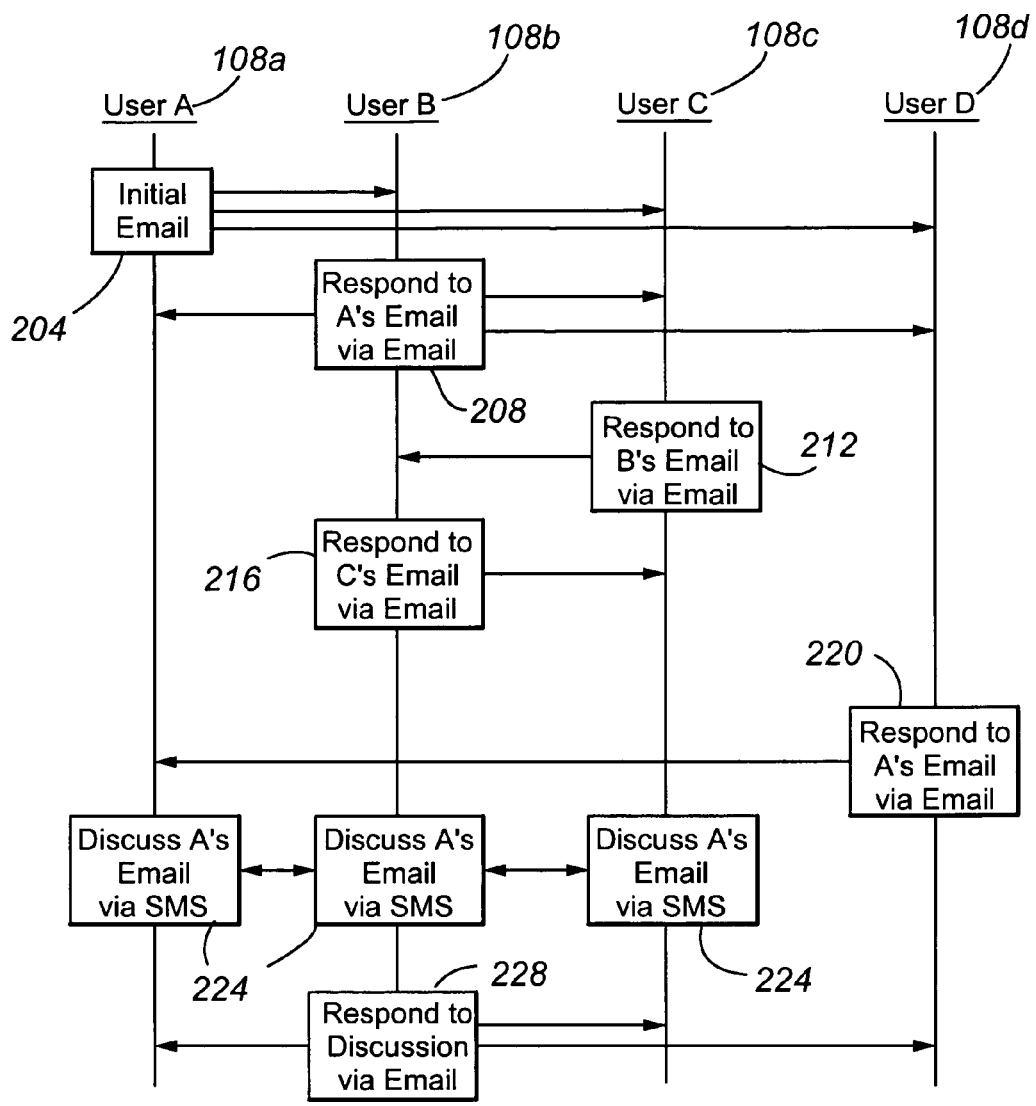
FIG. 2 is a block diagram depicting an example interaction between multiple users in accordance with embodiments of the present invention.

FIG. 2 illustrates an exemplary interaction between multiple users in accordance with at least some embodiments of the present invention. The exemplary conversation is depicted as being conducted between four users each using a different communication device 108*a*-*d*. As can be appreciated by one of skill in the art, however, a greater or lesser number of participants may engage in a single conversation. Moreover, a conversation may take place between multiple users on a single communication device 108. The conversation is initiated when User A sends three recipients, Users B, C, and D, an initiating email 204. All three users receive the initiating email from User A although not necessarily at the same point in time. User B is the first to respond to the initiating email 204 with a first response email 208. The first response email 208 is sent to all participants that were originally included in the conversation by User A.

Some time later, User C responds to User B's email with a third response email 212. The third response email 212 is only sent to User B. Accordingly, User C may not want any other user to ever view the third response email 212. To accomplish this, User C marks the third response email 212 as private. Thereafter, a flag is associated with the third response email 212 indicating that some user has marked the third response email 212 as private. In one embodiment, the user that marked the message as private is the only user allowed to remove the flag. Alternatively, the sending user may not have marked the third response email 212 as private. Rather, User B, the receiving user, may mark the message as private. Once the message is marked as private, in one embodiment, any subsequent messages that follow the branch created by the private message may also be considered private. For example, when User B responds to User C's email and sends a fourth response email 216, the fourth response email 216 is automatically marked as private. User B may choose to remove the flag from the fourth response email 216 allowing the message to become public. If the fourth response email 216 is marked as public, then any subsequent responses to the fourth response email 216 may also be marked as public by default. Furthermore, when the fourth response email 216 is marked as public, the third response email 212 may also be marked as public, which would likely be the case if the fourth response email 216 contained content from the third response email 212. However, if the fourth response email 216 contains no content from the third response email 212, then the fourth response email 216 may be marked as public while the third response email 212 is still marked as private.

The conversation continues when User D responds to User A's email by calling User A. However, User A does not answer his/her phone and User D leaves a voice message 220 for User A. The voice message 220 may contain certain phases that include a string indicating that the voice message 220 was left in response to the first email 204. When the threading server 120 identifies that the voice message 220 was generated in response to the first email 204 and is a part of the conversation, then the threading server 120 groups the voice message 220 with other messages associated with the conversation.

At some point after User D has responded to User A, Users A, B, and C have a discussion using SMS messages 224 or some other type of text messaging application. The branch of the discussion using SMS messages 224 results in a thread of contacts generated by each participant. The threading server 120 identifies the entire thread of the discussion 224 as being associated with the conversation and groups the discussion 224 with other conversational messages accordingly.

After the discussion 224 has ended, User B generates a fifth response email 228, relating to the discussion 224. The fifth response email 228 is sent to all original participants in the conversation, namely Users A, C, and D.

In accordance with some embodiments of the present invention, the threading server 120 analyzes the content and timing of contacts to determine if they are associated with a single conversation. In alternative embodiments, a user can mark a contact as related to a conversation by activating an activator, such as a radio button or the like. With the activator activated, the threading server 120 can easily identify the contact as related to a conversation. Also, when responding to email contacts, if a user clicks the reply or forward button in response to a received email, then the subsequent contact may be automatically marked as associated with the conversation.

As various users respond to one another, more branches of the conversation are created. Each branch may correspond to a different set or subset of recipients and originators. Specifically, a first branch may exist corresponding to contacts sent between all recipients. The first branch may be considered the trunk of the conversation. A second branch may exist corresponding to contacts sent between only a couple users that were a part of the original recipients of the initiating contact. A third branch may exist corresponding to contacts sent to other users that were not a part of the original set of recipients. Each branch is ultimately associated with the same conversation and thus should be combined by the threading server 120 to create a comprehensive document of the entire conversation. However, as certain branches are marked as private or other branches are determined not to be related to the same conversation, then those branches are excluded from the comprehensive document.

Figure 3A:
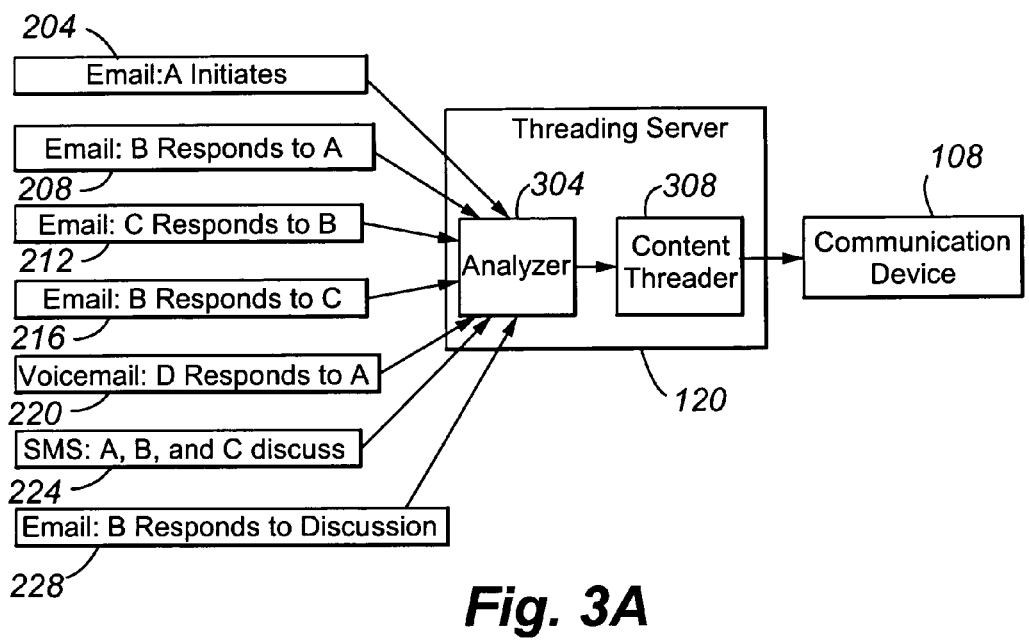
FIG. 3A is a block diagram depicting the threading of mixed media for a particular user in accordance with embodiments of the present invention.

Referring now to FIG. 3A, the creation of a comprehensive document for a single user will be described in accordance with at least some embodiments of the present invention. As noted above, the threading server 120 collects contacts that are associated with a conversation. To process the collected contacts, the threading server 120 comprises a contact analyzer 304 and a content threader 308. Once the threading server 120 has collected the contacts for the conversation, the contacts need to be combined into a comprehensive document. The first type of comprehensive document that can be created is one that has been personalized for a particular user. In other words, the comprehensive document comprises both public contacts associated with the conversation and private contact of which the particular user was either a sender or recipient. For example, the threading server 120 may create a personalized comprehensive document for User B.

In the conversation depicted and described in FIG. 2, User B was a party to the private branch containing the third 212 and fourth 216 response emails. All other contacts associated with the conversation have not been marked as private and therefore are available to any user. Accordingly, the threading server 120 groups all contacts associated with the conversation. Thereafter, the analyzer 304 analyzes the contacts to determine if any redundant content exists between the contacts. The analyzer 304 further removes redundant content from all but one of the redundant contacts. Thereafter, the contacts are sent to the content threader 308 where all of the contacts associated with the conversation are compiled into a single comprehensive document. The comprehensive document may contain contacts of disparate media types and may further include links to other contacts of media types that were not otherwise directly incorporated into the comprehensive document. For example, a link on the comprehensive document may lead to the voice contact 220. Once the comprehensive document has been created, it can be transmitted to the communication device associated with User B. Thus, User B can review the contents of the entire conversation on a single document.

Figure 3B:
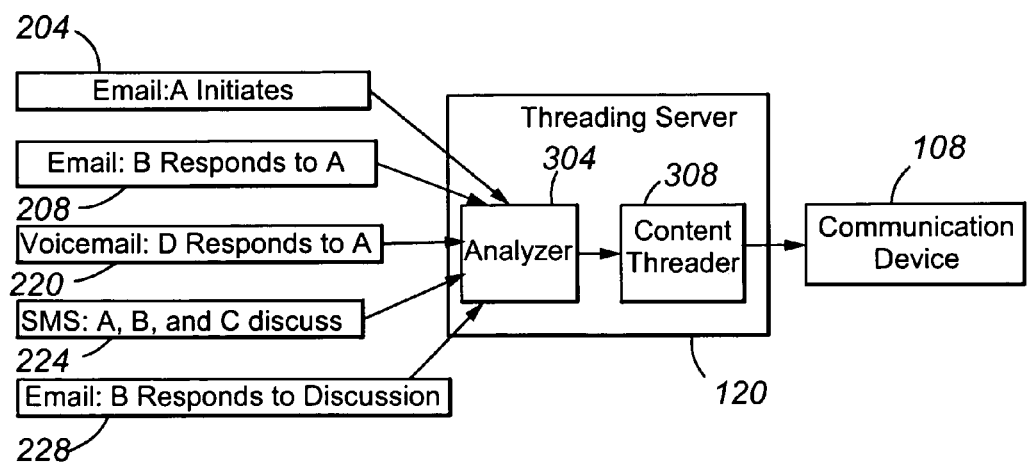
FIG. 3B is a block diagram depicting the threading of mixed media for a general document in accordance with embodiments of the present invention.

FIG. 3B depicts the creation of a comprehensive document for public use in accordance with at least some embodiments of the present invention. Contacts that may be included in the public comprehensive document generally include all contacts associated with the conversation excluding the privately marked contacts (e.g., the third 212 and fourth 216 response emails). The threading server 120 collects all of the public contacts and sends them to the analyzer 304 to identify and remove any redundant content between contacts. After substantially all of the redundant content has been removed, the contacts are sent to the content threader 308 to be combined into a comprehensive public document. The public comprehensive document is then available for transmission to any communication device 108*a*-N. Subsequently, a user can review the public comprehensive document to identify what occurred during a conversation in the public domain.

Figure 4:
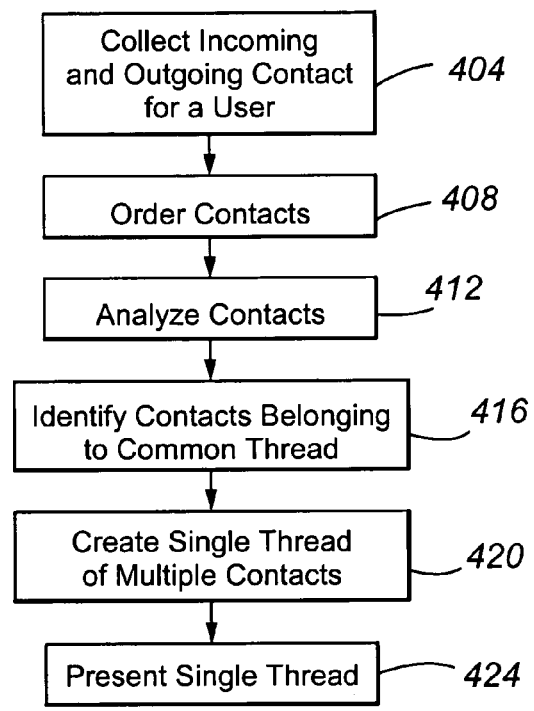
FIG. 4 is a flow chart depicting a method of threading mixed media for a particular user in accordance with embodiments of the present invention.

FIG. 4 depicts a method of creating a private comprehensive document in accordance with at least some embodiments of the present invention. The method begins as incoming and outgoing contacts for a particular user are collected (step 404). The threading server 120 may collect the incoming and outgoing contacts for a user as the contacts are sent and received. Alternatively, the threading server 120 may analyze the header and/or body of the contacts to determine if they are related to the same conversation. The threading server 120 does not need to check for privacy flags when creating a personalized document for a particular user. Rather, the threading server 120 can collect incoming and outgoing contacts and assume that if the user has already seen or created the contact, then the user has permission to view the contact in a comprehensive document.

After the contacts have been collected, the contacts are ordered chronologically and/or according to response information (step 408). The contacts are ordered chronologically to create a comprehensive document that reads chronologically. Of course, in the event that there are many users participating in a single conversation, one reply may be generated by one user long after several other users have generated many replies. For example, User D's response voicemail 220 may be placed above the response emails generated by Users B and C because it responded directly to User A's original email 204. Thus, the comprehensive document may be ordered chronologically and/or according to logical responses.

The ordered contacts are then analyzed to determine if any redundant content exists between two or more contacts (step 412). In the event that redundant content does exist between two or more contacts, then the analyzer 304 removes the redundant content from all but one of the contacts. Therefore, only one occurrence of any particular content will remain in the comprehensive document.

Once the redundant content has been substantially removed from the collection of contacts, the contacts are further analyzed to identify those contacts that belong to the common thread (step 416). The contacts belonging to the common thread that have been received and sent by the particular user may have their contents and headers analyzed to determine if they are actually related to the same conversation. As an example, there may be instances where a user participated in an IM session with several other users and for a brief time they had a discussion related to the conversation. The portion of the IM session that can be identified as related to the conversation may be added to the comprehensive document. However, the other portions that do not relate to the conversation may be excluded from the comprehensive document.

The contacts and/or portions of contacts associated with the conversation are then threaded together to create the comprehensive document (step 420). As can be appreciated there are a number of ways to generate a single comprehensive document. One such way is to convert all media types to a common media type. By way of illustration, speech and other voice media types can be converted by a speech-to-text engine and inserted into the comprehensive document in textual form. Alternatively, any contact that is originally text may be combined into the textual version of the comprehensive document and links or contact pointers can be inserted as a position indicator for the non-text contacts. By use of the pointer, a user may be presented the message in a non-textual format (i.e., a voice/video message may be played for the user) while the comprehensive text document is still presented to the user.

The combined document can then be transmitted to the communication device associated with the particular user (step 424). The personalized comprehensive document provides a single reference for the use if he/she wants to recall what occurred during the conversation. The personalized comprehensive document is intended to depict the conversation as it was experienced by a particular user.

Figure 5:
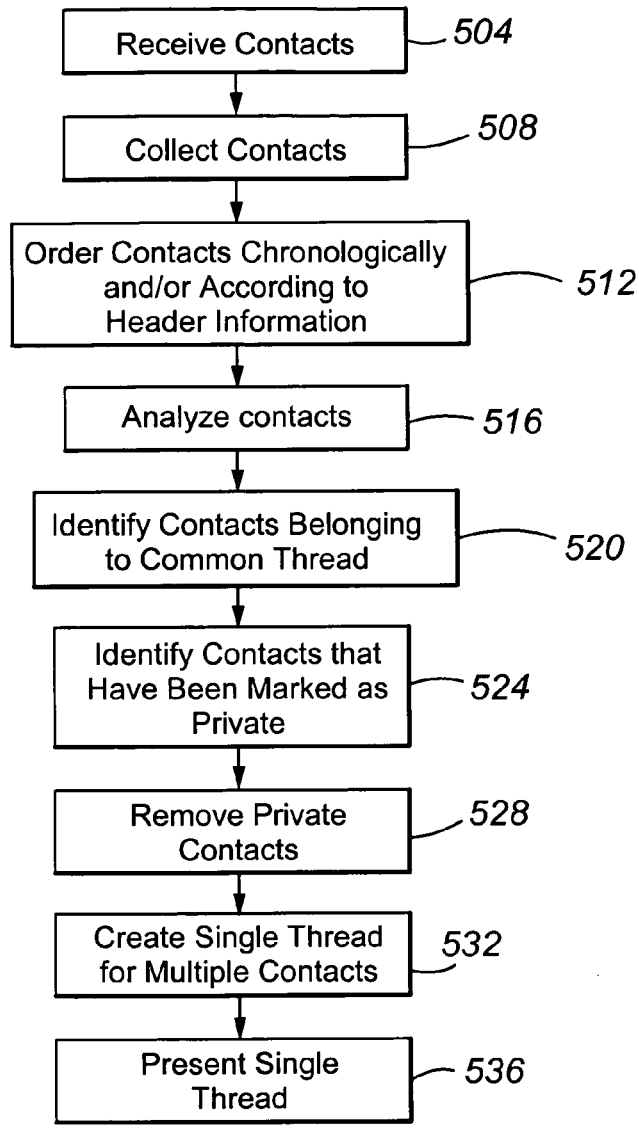
FIG. 5 is a flow chart depicting a method of threading mixed media for a general document in accordance with embodiments of the present invention.

Referring now to FIG. 5, a method of creating a public comprehensive document will be described in accordance with at least some embodiments of the present invention. The method begins when contacts are received (step 504). Thereafter, or after receipt of each contact, the contacts are collected (step 508). In one embodiment, a contact is only collected after it is determined with some amount of assurance that the contact is related to the conversation. For example, the threading server 120 may collect each text entry in an entire instant messaging session between multiple users. Likewise, when the reply button on an email is clicked by a user, it can be determined that the reply contact is associated with the conversation of the received contact.

After the contacts are collected, the contacts are ordered chronologically and/or according to response information (step 512). Once the contacts have been collected, the analyzer 304 analyzes the contacts to identify and remove redundant content as noted above (step 516). Thereafter, the content of the contacts may be further identified to determine if any contacts were not actually a part of the conversation or contributed noting to the conversation (step 520). For instance, an email contact forwarding a previous thread on to another user may not add any content to the comprehensive contact and can therefore be removed from the comprehensive contact. It should be noted that the act of forwarding a message to a particular participant that has not yet been involved in the conversation might be an indicator of a new branch of the conversation. Each contact in the comprehensive contact is then checked for a privacy flag (step 524). All contacts marked with privacy flags are not to be displayed publicly and are therefore removed from the public comprehensive document (step 528). The remaining contacts are threaded together into a single comprehensive document (step 532). The combined document is then maintained at the threading server 120 and/or database 124 and made available to any user having access to one or more of the communication devices 108 and/or other display apparatuses operable to receive the document from the threading server 120 (step 536).

Figure 6:
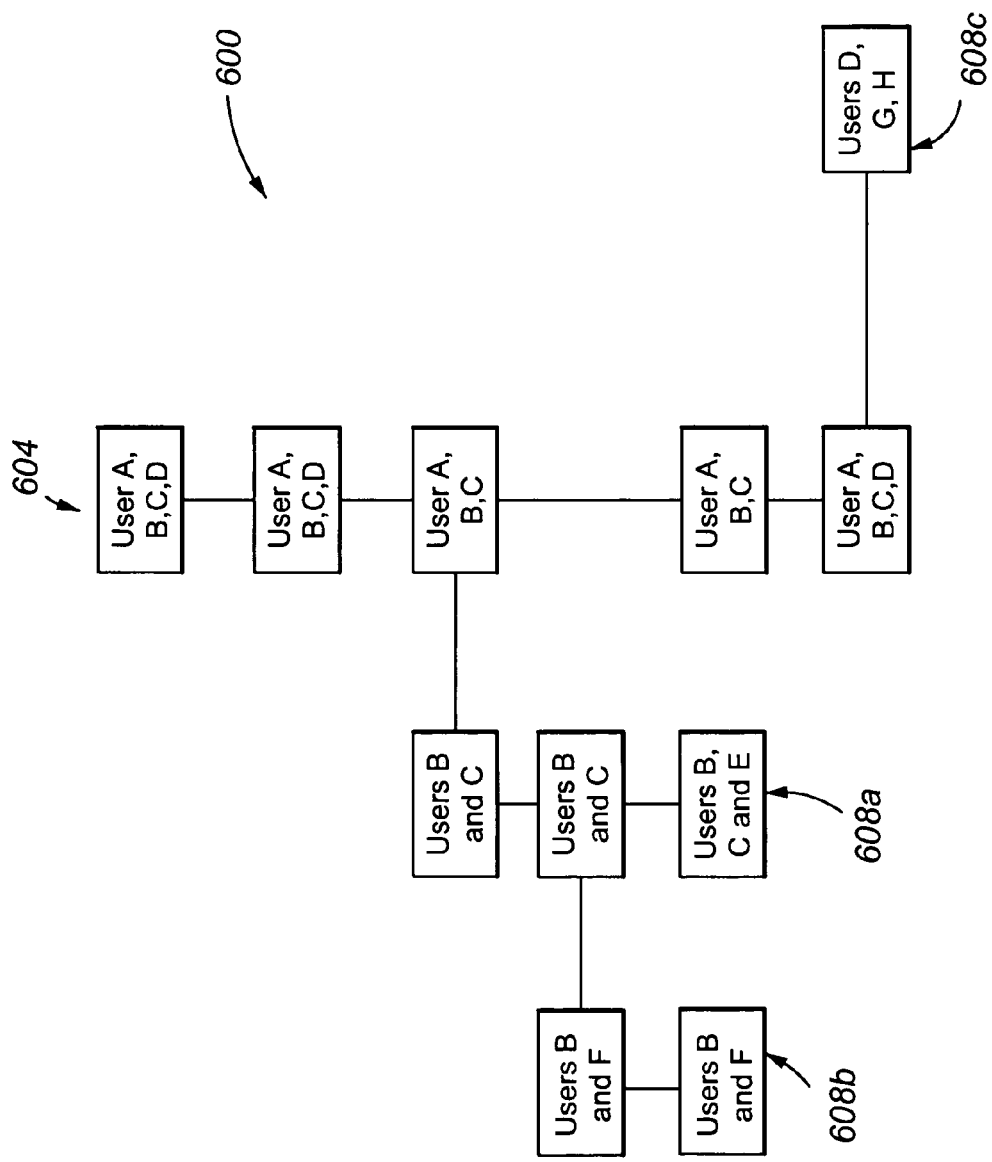
FIG. 6 is a diagram depicting a tree structure of a conversation.

With reference to FIG. 6, a diagram depicting a tree-type structure 600 of a conversation will be described in accordance with at least some embodiments of the present invention. The structure 600 comprises a trunk 604 or original conversation. A conversation is generally originated by a single user sending out a message or other type of contact to one or more recipients. Of course, more than one user may originate a conversation. Each node of the structure 600 represents a contact. Each node may include selected information regarding the contact including, for example, sender, date and time stamp information, communication modality indicator, etc. Each node may also comprise a full reproduction of content or a summarized version of the content and a link to the contact, depending upon the modality of the contact. The summary of a node may comprise only the new information not previously contained in the prior contacts.

As an illustrative example, user A may initiate a conversation by sending a contact to users B, C, and D. Additional contacts may result between those users in response to the original contact. At some point during the conversation user B may send a contact to user C and mark the contact as private. When a contact is marked as private, a new branch 608a may be created stemming from the trunk 604. Any conversation resulting from the private contact may become part of the private branch 608a. In response to the private conversation, user B may choose to send a contact to a new user F that was not a part of the original conversation. When a new user is incorporated into the conversation, a second branch 608b may be created. The second branch 608b corresponds to the conversation between user B and user F. A third branch 608c may be created after the first two branches when more users are incorporated into the conversation. Additional branches may be created, starting either from the original trunk 604 or from another branch 608. Some branches 608 may be created as a result of introducing a new participant to the conversation whereas other branches may be created for privacy or because a new modality of communication was employed.

In accordance with at least some embodiments of the present invention, a comprehensive document may be created for each branch 608. A comprehensive document for all branches may be made for the trunk 604, with certain branches having restricted access to participants in those branches. Also, summary documents may be made into links from the trunk 604 to other branches 608 that are not marked as private. The summary in the trunk 604 for the branch 608 may describe non-redundant content between the contacts of the branch 608 or the modality of communication used in the branch 608.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
   collecting a first communication, wherein the first communication has content in a first media type, wherein the content in the first media type is a voice message;
   collecting a second communication, wherein the second communication has content in a second media type, wherein the content in the second media type comprises text from at least one of a text message or an email message;
   analyzing the content in the first communication and the second communication to determine if the first communication and the second communication are part of a common conversation thread between two or more users, wherein the common conversation thread has at least two common users and common content, and wherein the common content includes content other than a common address;

in response to determining that the first communication and the second communication are part of the common conversation thread, converting at least the first communication to a common media type, wherein the common media type is the second media type;

creating a comprehensive document having a display for the common conversation thread that includes content from the first communication and content from the second communication, wherein content from the first communication and the second communication is expressed in the comprehensive document using the common media type, and wherein the content in the correspondence document includes content other than a common address;

providing to a user the comprehensive document as a representation of the content of the first communication and the content of the second communication, wherein the comprehensive document is displayed to the user as a text document, and wherein the content includes content other than a common address;

collecting a third communication related to the common conversation thread;

determining that the third communication has been marked as private by one of the at least two common users, wherein the one of the at least two common users is a recipient of the third message; and removing the third communication from the comprehensive document.

2. The method of claim 1, further comprising:
placing the removed third private communication into a second comprehensive document, wherein the second comprehensive document comprises the first communication and the second communication and the third private communication; and causing the second comprehensive document to be displayed to the identified user.

3. The method of claim 1, further comprising:
identifying at least one of a time of transmission and a communication responded to for each of the first communication and the second communication; and ordering the first communication and the second communication according to at least one of the time of transmission and communication responded to.

4. The method of claim 1, wherein the representation of the first communication and the second communication in the comprehensive document comprises textual content of the email message and at least one of a transcription of the voice message and a link to listen to the voice message.

5. The method of claim 1, further comprising: identifying repetitive content that exists in the first communication and the second communication; and removing the repetitive content from the comprehensive document.

6. The method of claim 1, further comprising removing any subsequent messages that follow a branch crated by third message.

7. The method of claim 6, wherein removing any subsequent messages that follow the branch created by the third message is accomplished until a user of a message in the branch marks a message in the branch public.

8. The method of claim 7, wherein determining if the first communication and the second communication are part of a common conversation thread is accomplished by counting a number of common strings in the first communication and the second communication and determining if the number of common strings is greater than a defined threshold.

9. A system comprising:
a plurality of communication devices each associated with at least one user;

a communication network providing communication capabilities between the plurality of communication devices, wherein the communication network communicates a first communication having a first media type and a second communication having a second media type, wherein the first media type is at least one of a voice message or a video message, and wherein the second media type comprises at least one of a-an email message, a text message, or an instant message; and a server connected to the communication network operable to:
analyze a plurality of communications to identify a set of related communications, wherein at least the first communication and the second communication comprise differing media types and at least the first communication and the second communication are associated with a common conversation thread, wherein the common conversation thread has at least two common users and common content, wherein the common content includes content other than a common address, and wherein the server analyzes the first communication as a first media type and the second communication as a second media type;

further operable to present to a user a comprehensive document as a combined representation of content of the first communication and the second communication, wherein the content of the first communication is represented as text, wherein the content of the first communication has been converted from the first media type to the text, and wherein one or more pointers are provided in the comprehensive document that links the comprehensive document to the second communication; and further operable to analyze a third communication related to the common conversation thread, determine that the third communication has been marked as private by one of the at least two common users, wherein the one of the at least two common users is a recipient of the third message, and remove the third communication from the comprehensive document.

10. The system of claim 9, wherein the first communication is sent from a first communication device and the second communication is sent from a second communication device.

11. The system of claim 9, wherein the server is also operable to generate a single communication comprising textual content of the email message and at least one of a transcription of the voice message and a link to listen to the voice message.

12. The system of claim 9, wherein a third communication associated with the common conversation thread comprises a privacy flag, and wherein the server is further operable to remove the third communication from the comprehensive document.

13. The system of claim 12, wherein the server provides the comprehensive document with the third communication removed therefrom to the plurality of communication devices.

14. The system of claim 12, wherein the server is further operable to place the removed third communication into a second comprehensive document, wherein the second comprehensive document comprises the first communication and the second communication and the third communication, and provide the second comprehensive document to a communication device associated with the identified user.

15. The system of claim 9, wherein the server is further operable to identify redundant content that exists in the first communication and the second communication and to remove the redundant content from the comprehensive document.

16. The system of claim 9, wherein the server is further operable to identify at least one of a time of transmission and a communication responded to for the first communication and the second communication, and order the first communication and the second communication according to at least one of the time of transmission and communication responded to.

17. A method, comprising:
- identifying a first communication, a second communication, and a third communication, wherein the first communication, the second communication, and the third communication are communications and are part of a common conversation thread, wherein the common conversation thread has at least two common users and common content;
- before creating a comprehensive document, identifying content repeated in the first communication, wherein the repeated content is identified while the first communication has a first media type, wherein the repeated content is repeated in at least one other communication, and wherein the repeated content is not common address information associated with the first communication and the at least one other communication;
- before creating a comprehensive document, identifying second content repeated in the second communication, wherein the second repeated content is identified while the second communication has a first media type, wherein the second repeated content is repeated in the first communication; and
- converting at least one of the first communication, second communication, or third communication from a first media type to a common media type, wherein the first media type is a voice message, and wherein the common media type is text;
- providing the comprehensive document that is a display of the communication thread to a user, the display comprising a textual representation of the content of the first communication, the content of the second communication, and the content of the third communication, wherein the identified content is removed from a first comprehensive document but not from a second comprehensive document, and wherein the represented content includes the content of the first, second and third communications; and
- determining that the third communication has been marked as private by one of the at least two common users, wherein the one of the at least two common users is a recipient of the third message; and
- removing the third communication from the comprehensive document.

18. The method of claim 17, wherein the first communication and the third communication are disparate media types.

19. The method of claim 18, further comprising: generating the first comprehensive document with textual content from the email message and at least one of a transcription of the voice message and a link to the voice message.

* * * * *